Dec. 29, 1970     R. J. HAADSMA     3,550,353
BAIT SACK FORMING APPARATUS
Filed July 3, 1968
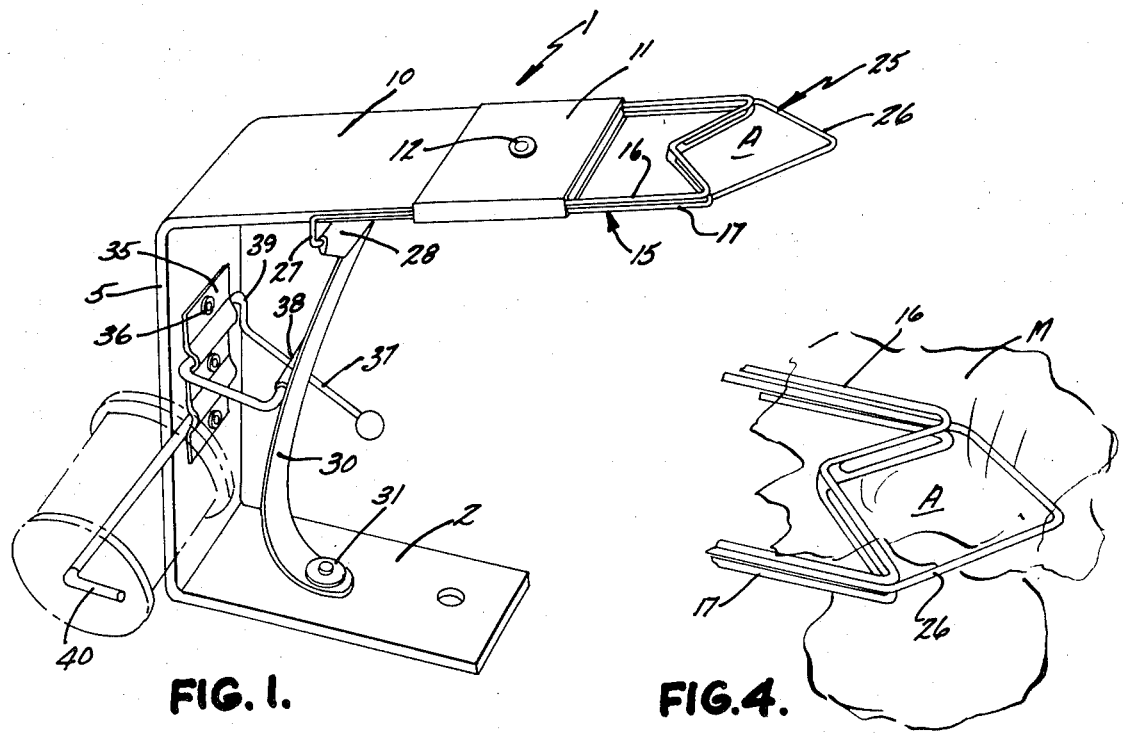
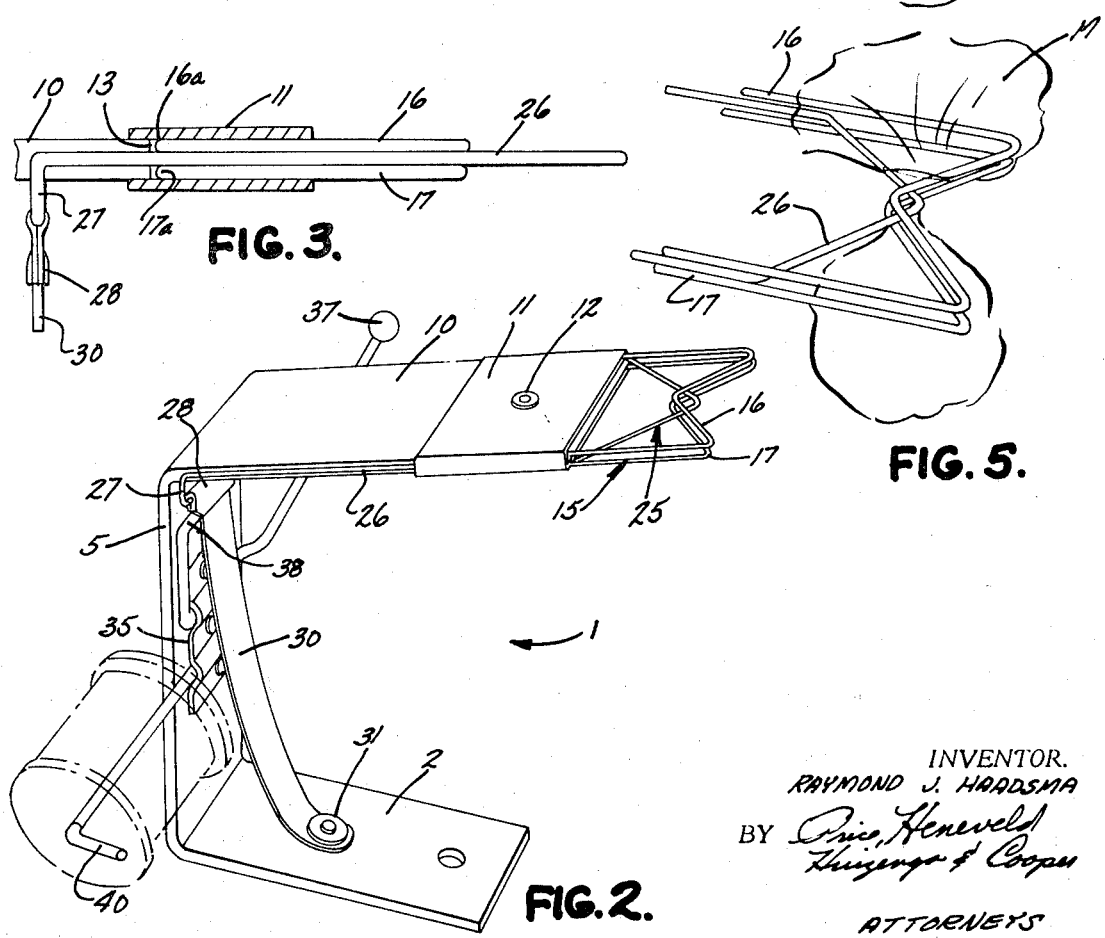
INVENTOR.
RAYMOND J. HAADSMA
BY
ATTORNEYS

United States Patent Office

3,550,353
Patented Dec. 29, 1970

3,550,353
BAIT SACK FORMING APPARATUS
Raymond J. Haadsma, 1315 Four Mile Road NE.,
Grand Rapids, Mich. 49505
Filed July 3, 1968, Ser. No. 742,225
Int. Cl. B65b 67/06
U.S. Cl. 53—390                            6 Claims

ABSTRACT OF THE DISCLOSURE

Apparatus for providing egg bait sacks and the like including a pair of holding elements including wire-like members, the elements lying in parallel planes in close proximity to one another and the members bent such that together they trace the perimeter of a sack receiving area, a guide for facilitating movement of one of the elements with respect to the other in their respective planes for varying the size of said area, and means for moving said one of said elements to and from a position minimizing said area defined by said members of said elements.

BACKGROUND OF THE INVENTION

This invention comprises a device especially adapted for use in the forming, filling, tying and trimming of sacks containing eggs to be used as bait when fishing. This is a very cumbersome job to most fishermen since the bait, such as fish eggs, is very difficult to work with. Additionally, the materials forming the bait sack are also difficult to work with since they of necessity must be thin and form the least possible obstruction for the bait. Most fishermen simply provide themselves with squares of material, such as pieces of nylon hosiery, and a jar of fish eggs and proceed to place eggs on the squares of material and then form the material into a sack, tying the ends together by means of a very thin thread and trimming the excess material away. All of these steps are performed by hand and it is extremely difficult, frustrating and time consuming to produce proper bait sacks.

Attempts have been made to provide devices which will aid the fisherman in the tasks described. However, no entirely satisfactory device has yet been provided. Such devices attempt to incorporate sliding bars for gripping the material together with pivoting members for holding the material in position for tying. However, such devices are unwieldy and still leave many operative steps to be handled by manipulation of the user's fingers and hands and this results in the same disadvantages as one encounters when attempting to tie such sacks by hand.

It is an object of this invention to provide an improved device of the nature described which automatically accomplishes many steps of the bait sack forming process, enabling the user to produce such bait sacks more quickly, more accurately and with less effort.

It is a further object of this invention to provide such a device which utilizes wire-like members for forming and gripping the sack material, the members moved through the use of a unique apparatus for manipulating them.

A further object of the invention is to provide such a device which is especially adapted to be set up on a table or other flat work surface for ease of operation.

A further object of the invention is the provision of such a device which enables one to form bait sacks without touching the fish eggs in any way.

A further object of the invention is the provision of such a device which enables one to have both hands completely free for forming, tying and trimming the bait sack.

A further object of the invention is the provision of such a device which minimizes overlap of material in the gathering process in forming the sack, thus making a better bait sack.

SUMMARY OF THE INVENTION

This invention relates to an apparatus for facilitating the holding, filling and tying of egg bait sacks for fishing and the like, comprising a first holding element including a wire-like member and a second holding element including a wire-like member. The first and second elements are positioned to lie in parallel planes in close proximity one to another. The wire-like members of the elements are bent such that the members together trace the perimeter of a sack receiving area. A guide is provided for facilitating movement of one of the elements with respect to the other of the elements in their respective planes, thereby reducing the size of the area described. Means are also provided for moving the said one of the elements to a position minimizing said area defined by said elements.

DESCRIPTION OF THE DRAWINGS

FIG. 1 is a side perspective view of the apparatus of this invention, the apparatus positioned to receive sack forming material;

FIG. 2 is a view similar to FIG. 1, the apparatus positioned in material holding position for tying and trimming a sack;

FIG. 3 is an enlarged side view showing the positioning of the wire-like sack forming members with respect to each other and their guide, certain portions being cut away to better show the invention;

FIG. 4 is an enlarged view of the wire-like members shown in position receiving sack forming material; and FIG. 5 is a view similar to FIG. 4, the wire-like members moved to material holding position.

DESCRIPTION OF THE PREFERRED EMBODIMENT

The apparatus of this invention is designated by the reference number 1 (FIGS. 1 and 2). The apparatus includes a base 2, an upstanding leg 5 and a guide arm 10 extending from the leg and over the base. An opening 3 is provided in the base 2 for facilitating the mounting of the device on a table or similar work surface. A guide collar 11 is secured to the guide arm 10 by suitable means, such as a rivet 12, the guide collar 11 being of a size receiving the holding elements to now be described between itself and the sides of the guide arm.

A first holding element 15 and a second holding element 25 are associated with the guide arm 10 and guide collar 11. In the embodiment shown, holding element 15 includes a pair of wirelike members 16 and 17, bent generally to the shape of an M, the ends 16a and 17a thereof respectively positioned within notches 13 formed in the sides of the guide arm 10 under the guide collar 11 (FIG. 3). The second holding element 25 includes a wire-like member 26 bent generally to the shape of a V, the wire-like member lying between the members 16 and 17 of the first holding element 15, extending through the collar 11 along the sides of the guide arm 10, the ends 27 pivotally secured to a retainer 28, the purpose of which will be described hereinafter. The elements 15 and 25 lie in generally parallel planes in close proximity to one another. Additionally, the members 16, 17 and 26 are being bent as described, the elements together trace the perimeter of the sack receiving area A (FIGS. 1 and 4), the purpose of which will be more fully described hereinafter. It should be noted that a preferred embodiment of the first and second holding elements has been shown. It should be specifically understood that the configuration of the wire-like members 16, 17 and 26 could vary from the shapes noted so long as they togethar traced the perimeter of a sack receiving area of the type to be described hereinafter. Additionally, it should be specifically noted that holding element 15 could include only one wire-like element of the type described the second holding element also including one wire-like member, or the second holding element 25 could also include two wire-like members 26 bent as described.

One end of a leaf spring 30 is secured to the base 2 by suitable means, such as a rivet 31. The other end of this leaf spring is secured to the retainer 28. As positioned, the leaf spring 30 normally biases the retainer 28 toward the upstanding leg 5, thus normally pulling the wire-like member 26 of the second holding element 25 in the same direction. A lever clamp 35 is secured to the inner face of the upstanding leg 5 by suitable means, such as the rivets 36. The lever 37 is bent to extend under the clamp 35, terminating in a cam 38 which bears against leaf spring 30. The clamp is positioned such that movement of the lever 37 to the position shown in FIG. 1 moves the cam 38 over center with respect to the spring 30. A bend 39 in the lever 37 forms a stop so that the second holding element 25 is held in the position shown in FIG. 1. A thread spool holder 40 is also removably mounted under the clamp 35.

OPERATION

The lever 37 is first moved downwardly, camming and tensioning the leaf spring 30 to the position shown in FIG. 1, the area A being at its maximum size in this position. The stop 39 described holds the device in this position so that the user's hands are completely free. A piece of material, such as nylon M, is placed over the opening defined by the area A (FIG. 4). Bait eggs are then taken into a spoon (not shown) and the material M is depressed into the area A by means of the spoon or similar type of dispenser. The bait eggs are deposited into the depressed portion of the material by the spoon in the same operation as can be seen from FIG. 4. The spoon is then removed and the lever 37 is raised to the position shown in FIG. 2. The spring 30 being biased toward the upstanding leg 5, the wire-like member 26 is drawn in the same direction, gradually minimizing the area A as it moves. This gathers the material M into the form of a round sack as shown in FIG. 5 and holds it in position for the tying and trimming operation. Again, the user's hands are completely free since the spring 30 is biased against the clamped material. Due to the slight remaining pressure of the leaf spring, the formed sack may be snugged up around the eggs by pulling up on the excess material. The sack is then tied from underneath with thread which can be easily taken from a spool of thread positioned on the spool holder 40. From the top, the excess sack material can then be trimmed off and the sack removed by simply moving the lever 37 back to the position shown in FIG. 1, enlarging the area A as described.

It should be noted that throughout this entire operation, it is unnecessary to touch or handle the bait eggs in any way. Further, the sacks may be prepared through use of the device with ease and speed. The shape of the wire-like members 16, 17 and 26 forming the area A, together with the unobstructed positioning thereof through the base 2, upstanding leg 5 and the guide arm 10 form a convenient area for the filling process. By forming the wire-like members such that an area is provided which gradually decreases in size through movement of the second holding element, uniform gathering of the material into a round sack is assured. Through the several operations provided in the construction of the wire-like members, a device can be provided which will positively work with almost any material. For example, many fishermen use material squares made from discarded nylon hose which is very sheer and also snags easily. Through the use of the three wire-like members described in the preferred embodiment, overlap of material is minimized in the gathering process. Further, snagging is prevented and maximum visibility for the tying process is inherent in the structure.

Although only one embodiment of this invention has been shown and described, it may be possible to practice the invention through the utilization of certain other embodiments without departing from the sprit and scope thereof. Such other embodiments are to be considered a part of this invention unless the following claims specifically state otherwise.

The embodiments of the invention in which an exclusive property or privilege is claimed are defined as follows:

1. An apparatus for facilitating the holding, filling and tying of egg bait sacks and the like, comprising: a base; and upstanding leg extending from said base; a guide arm extending from said leg over said base; a first holding element including a wire-like member secured to said guide arm; a second holding element including a wire-like member mounted on said guide arm for sliding movement with respect to said first element; said members lying in generally parallel planes in close proximity to one another and bent to together trace the perimeter of a sack receiving area; a leaf spring secured to said second element and normally biasing said second element such that said area is minimized; a cam engaging said spring and a lever secured to said cam for moving said cam, said spring and said second element for varying the size of said area.

2. An apparatus as defined in claim 1, one of said first and second elements including two wire-like members each bent as described, the wire-like member of the other element lying therebetween.

3. An apparatus as defined in claim 1, said leaf spring secured between said base and said second element, said cam pivotally secured to said upstanding leg.

4. An apparatus as defined in claim 1, the member of one of said elements bent to generally an M shape and the member of the other of said elements bent to generally a V shape.

5. An apparatus as defined in claim 1 including a spool holder extending outwardly from said upstanding leg.

6. An apparatsu as defined in claim 1 including stops associated with said lever for holding said second element in its two extreme positions of movement.

References Cited

UNITED STATES PATENTS

| 1,400,327 | 12/1921 | Sparks | 53—135 |
| 1,635,035 | 7/1927 | Dickinson | 53—285X |
| 2,838,897 | 6/1958 | Ponten et al. | 53—226 |
| 3,175,338 | 3/1965 | Ahlgren et al. | 53—390 |

THERON E. CONDON, Primary Examiner

R. L. SPRUILL, Assistant Examiner

U.S. Cl. X.R.

248—97